US011850621B2

(12) United States Patent
Wang et al.

(10) Patent No.: US 11,850,621 B2
(45) Date of Patent: Dec. 26, 2023

(54) EDGE BLACKENING FOR OPTICAL DEVICES

(71) Applicant: Applied Materials, Inc., Santa Clara, CA (US)

(72) Inventors: Kangkang Wang, San Jose, CA (US); Yaseer Arafath Ahamed, Austin, TX (US); Yige Gao, Santa Clara, CA (US); Benjamin B. Riordon, Newburyport, MA (US); Rami Hourani, Santa Clara, CA (US); James D. Strassner, Austin, TX (US); Ludovic Godet, Sunnyvale, CA (US); Thinh Nguyen, Round Rock, TX (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/456,410

(22) Filed: Nov. 24, 2021

(65) Prior Publication Data

US 2022/0212223 A1  Jul. 7, 2022

Related U.S. Application Data

(60) Provisional application No. 63/117,569, filed on Nov. 24, 2020.

(51) Int. Cl.
*B05C 1/00* (2006.01)
*B05D 1/00* (2006.01)
(Continued)

(52) U.S. Cl.
CPC .............. *B05C 1/006* (2013.01); *B05C 1/027* (2013.01); *B05C 13/00* (2013.01); *B05D 1/002* (2013.01); *B05D 5/061* (2013.01)

(58) Field of Classification Search
None
See application file for complete search history.

(56) References Cited

U.S. PATENT DOCUMENTS 8,168,255 B2 * 5/2012 Samukawa ...... B29D 11/00865
427/427.3
9,573,144 B2 2/2017 Wang et al.
(Continued)

FOREIGN PATENT DOCUMENTS

| JP | 2007230849 A | 9/2007 |
|----|--------------|--------|
| JP | 2002028552 A | 1/2022 |
| WO | 2019241389 A1 | 12/2019 |

OTHER PUBLICATIONS

International Search Report issued to PCT/US2021/060598 dated Mar. 22, 2022.

*Primary Examiner* — Jethro M. Pence
(74) *Attorney, Agent, or Firm* — Patterson + Sheridan, LLP (57) ABSTRACT

An optical device coating assembly is provided. The optical device coating assembly includes a substrate support operable to retain an optical device substrate. The coating assembly further includes a first actuator connected to the substrate support. The first actuator is configured to rotate the substrate support. The coating assembly includes a holder configured to hold a coating applicator against an edge of the optical device substrate when the optical device substrate is rotated on the substrate support and a second actuator operable to apply a force on the holder in a direction towards the substrate support. The second actuator is a constant force actuator.

17 Claims, 5 Drawing Sheets

(51) Int. Cl.
*B05D 5/06* (2006.01)
*B05C 1/02* (2006.01)
*B05C 13/00* (2006.01)

(56) References Cited

U.S. PATENT DOCUMENTS

| | | | |
|---|---|---|---|
| 11,413,649 B2* | 8/2022 | Otsuki | ................... B05D 7/24 |
| 11,534,792 B2* | 12/2022 | Schlichtenbrede | ... B05C 1/0873 |
| 2014/0038422 A1 | 2/2014 | Pavani et al. | |
| 2019/0377200 A1* | 12/2019 | Xing | .................. B29C 35/0288 |

* cited by examiner

EDGE BLACKENING FOR OPTICAL DEVICES

CROSS-REFERENCE TO RELATED APPLICATIONS

This application claims benefit of U.S. provisional patent application Ser. No. 63/117,569, filed Nov. 24, 2020, which is hereby incorporated herein by reference.

BACKGROUND

Field

Embodiments of the present disclosure generally relate to optical devices. More specifically, embodiments described herein relate to an optical device coating assembly and method of coating the edge of optical devices with optically absorbent material.

Description of the Related Art

Virtual reality is generally considered to be a computer-generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Optical devices including waveguide combiners, such as augmented reality waveguide combiners, and flat optical devices, such as metasurfaces, are used to assist in overlaying images. Generated light is propagated through an optical device until the light exits the optical device and is overlaid on the ambient environment.

Optical devices may require coating the edges of the optical devices with a coating of optically absorbent material. The coating of optically absorbent material improves the performance of the optical device. It is desirable for the coating to be uniform or substantially uniform across the entire edge of the optical device. Waveguide combiners generally have an irregular shape, which presents a challenge for providing a uniform coating on the edges of the waveguide combiner.

Accordingly, what is needed in the art are improved methods of coating the edges of optical devices with the optically absorbent material.

SUMMARY

In one embodiment, an optical device coating assembly is provided. The optical device coating assembly includes a substrate support operable to retain an optical device substrate. The coating assembly further includes a first actuator connected to the substrate support. The first actuator is configured to rotate the substrate support. The coating assembly includes a holder configured to hold a coating applicator against an edge of the optical device substrate when the optical device substrate is rotated on the substrate support and a second actuator operable to apply a force on the holder in a direction towards the substrate support. The second actuator is a constant force actuator.

In another embodiment, an optical device coating assembly is provided is provided. The coating assembly includes a substrate support; a first actuator connected to the substrate support, wherein the first actuator is configured to rotate the substrate support; a holder configured to hold a coating applicator against an edge of an optical device substrate that is rotated on the substrate support; and a controller in communication with the first actuator, the controller configured to cause the first actuator to adjust the rotational speed of the substrate support in order to cause different portions of an edge of a non-circular optical device substrate positioned on the substrate support to rotate against a coating applicator in the holder at a constant linear speed.

In another embodiment, a method of coating an optical device substrate is provided. The method includes positioning an optical device substrate on a substrate support, the optical device substrate including a bottom surface, a top surface, and one or more edges connecting the bottom surface with the top surface; rotating the substrate support with a first actuator to rotate the optical device substrate; and applying an optically absorbent coating to the one or more edges of the optical device substrate with a coating applicator positioned in a holder as the optical device substrate is rotated, wherein a second actuator applies a constant force to the holder during the applying of the optically absorbent coating.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices. More specifically, embodiments described herein relate to equipment and methods for coating the edge(s) of optical devices (e.g., edges of a substrate to be used as a waveguide combiner or a flat optical device) with an optically absorbent material.

Although the following is largely described in reference to applying an optically absorbent coating to an optical device substrate that is to be used as a waveguide combiner, the advantages of the disclosure are applicable to applying a coating on the one or more edges of other substrates. Used herein, the term constant linear speed refers to a linear speed that is within 1% of a reference linear speed. Used herein, the term substantially constant linear speed refers to a linear speed that is within 5% of a reference linear speed.

Figure 1A:
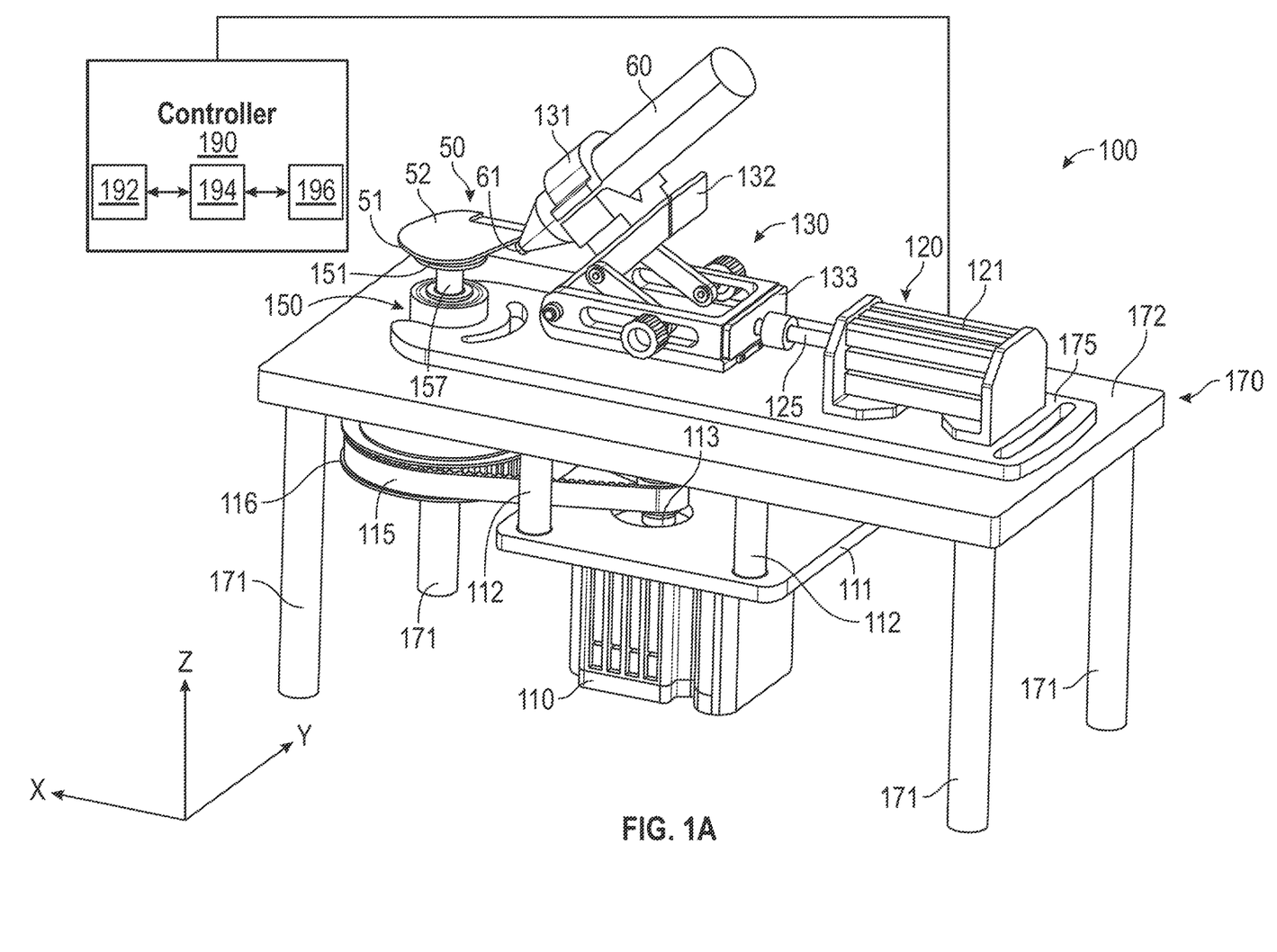
FIG. 1A is a perspective view of a coating assembly, according to one embodiment.

FIG. 1A is a perspective view of an optical device coating assembly 100, according to one embodiment. The optical device coating assembly 100 is used to provide a coating on the edges 51 of an optical device substrate 50.

The optical device substrate 50 includes the edges 51, a top surface 52, and a bottom surface 53. The edges 51 connect the bottom surface 53 with the top surface 52. The optical device coating assembly 100 can be used to coat the edges 51 of an optical device substrate 50 with a coating, such as a coating of an optically absorbent material. The optically absorbent material can darken (e.g., blacken) the edges of the optical device substrate 50. In one embodiment, which can be combined with other embodiments described herein, the optical device substrate 50 includes, but is not limited to silicon (Si), silicon dioxide (SiO2), fused silica, quartz, glass, silicon carbide (SiC), germanium (Ge), silicon germanium (SiGe), indium phosphide (InP), gallium arsenide (GaAs), gallium nitride (GaN), or sapphire. In one embodiment, which can be combined with other embodiments described herein, the optical device substrate 50 is a waveguide combiner. In other embodiments, the optical device substrate can be a different type of device, such as a flat optical device, such as a flat optical device including a metasurface. In another embodiment, which can be combined with other embodiments described herein, the optical device substrate 50 can have optical device structures (e.g., structures having critical dimensions less than 1 micron) disposed on the optical device substrate 50.

The optical device coating assembly 100 includes a substrate support 150. The substrate support 150 can be used to retain and rotate the optical device substrate 50 such that the edges 51 of the optical device substrate 50 are coated. The optical device coating assembly 100 further includes a first actuator 110 that is used to rotate the substrate supporting surface of the substrate support 150. The optical device coating assembly 100 further includes a holder 130 configured to hold an applicator 60 (e.g., a marker) that is used to coat the edges 51 of the optical device substrate 50. The optical device coating assembly 100 further includes a pneumatic actuator 120 (also referred to as second actuator) that is used to move the holder 130 and the applicator 60, for example in the X-direction, to enable the applicator 60 to contact and coat the edges 51 of the optical device substrate 50.

The optical device coating assembly 100 further includes a platform 170 that is used to support and arrange the other components of the optical device coating assembly 100. The platform 170 includes four legs 171 and a top 172 that is supported by the four legs 171. The optical device coating assembly 100 further includes a mounting block 175 positioned on the top 172 of the platform 170. In some embodiments, the mounting block 175 can include a track or guide (not shown) that can be used to ensure the holder 130 only moves in a specified direction (e.g., only in the X-direction). For example, the holder 130 could include a protrusion (not shown) extending from the bottom of the holder 130 to ensure the holder 130 moves along the track or guide in the mounting block 175 to provide for the movement that occurs only in the specified direction.

The substrate support 150 can include a vacuum chuck 151. The optical device substrate 50 can be placed on the vacuum chuck 151. The vacuum chuck 151 can be replaceable. The vacuum chuck 151 can grip defined zones of the optical device substrate 50, such as the non-exclusion zones of the optical device substrate 50. Although this disclosure describes the substrate being placed on 151 vacuum chuck, other types of substrate supporting surfaces can also be used. The vacuum chuck 151 can hold the optical device substrate 50 in place as the optical device substrate 50 is rotated. Additional information on the vacuum chuck is provided in the description of FIGS. 1B-1D below. The substrate support 150 can further include a rotary shaft 157 that is connected to the vacuum chuck 151. The rotary shaft 157 is coupled to the first actuator 110 as described below enabling the first actuator 110 to control the rotation of the vacuum chuck 151. The first actuator 110 and the vacuum chuck 151 may be configured to rotate at least 360 degrees enabling the coating applicator 60 to coat the edges 51 of the optical device substrate 50 along the rotation.

The first actuator 110 is used to rotate the substrate support 150. The first actuator 110 can be an electric motor that is configured to rotate at different speeds, such as a servo or a motor connected to a variable frequency drive. The first actuator 110 can include an output shaft 113. The output shaft 113 of the first actuator 110 can be coupled to another pulley (not shown). The optical device coating assembly 100 further includes a belt 115 and a pulley 116 to couple the rotational output of the first actuator 110 to the substrate support 150. The pulley 116 can be coupled to the rotary shaft 157 of the substrate support 150. The belt 115 and pulley 116 can be used to rotate the substrate support 150 at a different speed than the rotational speed of the first actuator 110. The belts and pulleys described herein can be configured to be zero backlash belts (e.g., zero backlash timing belt) and pulleys.

The first actuator 110 can be suspended below the top 172 of the platform 170. The first actuator 110 can be mounted to a plate 111 that is supported by supports 112 that are connected to the top 172 of the platform 170.

The holder 130 is used to hold the coating applicator 60 against the edges 51 of the optical device substrate 50 as the edges 51 of the optical device substrate 50 are rotated past and against a tip 61 of the coating applicator 60. The holder 130 includes a clamp 131, a tilt arm 132, and a base 133. The base 133 can be a slidable base that can slide, for example towards or away from the substrate support 150. The clamp 131 is used to hold the coating applicator 60. The angle of the tilt arm 132 can be adjusted. For example, in one embodiment the angle of the tilt arm 132 can be adjusted in the XZ plane to orient the coating applicator 60 to be completely horizontal, completely vertical, or any angle in between. In some embodiments, the tilt arm 132 can also allow for angular adjustments in the XY plane, for example allowing the angle of coating applicator 60 to be adjusted plus or minus 15 degrees in the XY plane.

The coating applicator 60 includes the optically absorbent material to be coated on the edges 51 of the optical device substrate 50. The coating applicator 60 is shown as a marker pen, but other types of coating applicators can be used. In various embodiments, which can be combined with other embodiments described herein, the applicator 60 can be a marker, pen, marker pen, a sponge applicator, a foam applicator, or a rubber wheel. The coating applicator 60 can apply optically absorbent coatings to the edges 51 of the optical device substrate 50. Examples of optically absorbent coatings that can be used can include, but are not limited to, one or more pigment or die filled UV curable adhesives, one or more pigment or die filled heat curable adhesives, pigmented ink, or combinations thereof.

The base 133 can be coupled to the pneumatic actuator 120. The base 133 can receive force from the pneumatic actuator 120 and apply that force to either move the holder 130 and/or to apply a corresponding force against the edges 51 of the optical device substrate 50 through the tip 61 of the coating applicator 60.

As described in additional detail below in reference to FIG. 1B, the optical device substrate 50 has an irregular shape (i.e., the top surface 52 of the optical device substrate 50 has an irregular shape). This irregular shape of the optical device substrate 50 makes it necessary for the tip 61 of the coating applicator 60 to move, for example in the X-direction, so that the tip 61 of coating applicator 60 can remain pressed against the edges 51 of the optical device substrate 50 while still allowing for the optical device substrate 50 to be smoothly rotated.

The pneumatic actuator 120 can include a base 121 and an extending portion 125. The base 121 can receive pressurized air from a compressed air source (not shown) and apply force from the pressurized air to the extending portion 125. The extending portion 125 can apply this force to press against the base 133 of the holder 130 to couple the force from the pneumatic actuator 120 to the holder 130, so that the tip 61 of the coating applicator 60 can move in relation to the optical device substrate 50 and/or press against the edges 51 of the optical device substrate 50 as the substrate is rotated on the substrate support 150.

The pneumatic actuator 120 can be a constant force actuator. The pneumatic actuator 120 can include a low-friction pneumatic cylinder. Using a constant force actuator as the pneumatic actuator 120 allows the pneumatic actuator 120 to apply a constant force to the holder 130 as the holder 130 moves, for example in the X-direction, to accommodate the irregular shape of the optical device substrate 50. For example, the pneumatic actuator 120 can be configured to move the tip 61 of the coating applicator 60 in the holder 130 from a first position P1 (i.e., the position in which the tip 61 is located in FIG. 1A) to a second position P2 (e.g., a position that the tip 61 would move to when a portion of the edge 51 that extends out further than P1 from a center of the substrate support 150 is rotated in front of the tip 61). As the portion of the edge 51 of the optical device substrate 50 that extends out to P2 is rotated in front of the coating applicator 60, the pneumatic actuator 120 allows movement of the holder 130 in the X-direction, so that the constant force of the tip 61 of the coating applicator 60 against the edge of the optical device substrate 50 can be maintained.

This constant force applied to the holder 130 allows for the tip 61 of the coating applicator 60 to remain pressed against the edges 51 of the optical device substrate 50 with a corresponding constant force for the entire 360 degrees rotation of the irregularly shaped optical device substrate 50. For example, during rotation of the optical device substrate 50, the pneumatic actuator 120 may be configured to move the extending portion 125, so that the holder 130 moves, and the constant force can remain against the edge 51 of the optical device substrate 50. This corresponding constant force of the tip 61 of the coating applicator 60 against the edges 51 of the optical device substrate 50 is one factor that enables a coating having a uniform thickness to be applied to the edges 51 of the optical device substrate 50.

In some embodiments, the constant force applied by of the tip of the coating applicator 60 against the edge 51 of the optical device substrate 50 is from about 0.01 lbf to about 1.0 lbf, such as from about 0.05 lbf to about 0.5 lbf, such as about 0.25 lbf. In some embodiments, the uniform thickness of the coating applied by the coating applicator 60 to the edges 51 of the substrate is between about 100 µm and about 1000 µm, such as from about 300 µm to about 500 µm, such as about 400 µm.

In one embodiment, instead of moving the holder 130, the angle of the tip 61 of the coating applicator 60 relative to the edge 51 of the optical device substrate 50 may change to accommodate the irregular shape of the optical device substrate 50. For example, the coating applicator 60 could extend substantially parallel to the surface of the optical device substrate 50 when the portion of edge 51 closest to the center of the substrate support 150 is rotated past the tip 61. The coating applicator 60 could then rotate in the XZ plane to being substantially perpendicular to the surface of the substrate when the portion of edge 51 furthest from the center of the substrate support 150 is rotated past the tip 61.

The optical device coating assembly 100 further includes a controller 190 connected to the equipment shown in FIG. 1A, such as the first actuator 110, the pneumatic actuator 120, and the vacuum chuck 151. The controller 190 can be any type of controller used in an industrial setting, such as a programmable logic controller (PLC). Although the controller 190 is shown as a single component, this is not required. In some embodiments, the controller 190 can be distributed across multiple components of the optical device coating assembly 100. For example, in some embodiments the first actuator 110 can be a "smart" motor that can be programmed to rotate according to a specific speed profile based on the shape of the top surface of the optical device substrate 50 and the positioning of the optical device substrate 50 on the substrate support 150. The controller 190 includes a processor 192, a memory 194, and input/output (I/O) circuits 196. The controller 190 can further include one or more of the following components (not shown), such as one or more power supplies, clocks, communication components (e.g., network interface card), and user interfaces typically found in controllers for equipment described herein.

The processor 192 is configured to execute various programs stored in the memory 194, such as a program configured to execute the methods described below in reference to FIGS. 2 and 3. The memory 194 can further include various operational settings used to control the optical device coating assembly 100. For example, the settings can include settings for controlling (1) the force applied by the pneumatic actuator 120 and (2) speed settings for the first actuator 110 based on the shape of the optical device substrate 50 being rotated by the substrate support 150 among various other settings.

The memory 194 can include non-transitory memory. The non-transitory memory can be used to store routines and settings, such as a routine and settings used to execute the methods described below in reference to FIGS. 2 and 3. The memory 194 can include one or more readily available types of memory, such as read only memory (ROM) (e.g., electrically erasable programmable read-only memory (EEPROM), flash memory, floppy disk, hard disk, or random access memory (RAM) (e.g., non-volatile random access memory (NVRAM). Routines for coating different optical device substrates 50 can be generally stored in the memory 194. These routines can be executed by the processor 192 with signals being received from inputs (e.g., speed sensors, motor feedback sensors) and signals being transmitted to outputs (e.g., the first actuator 110 and the pneumatic actuator 120) through the I/O circuits 196. In one embodiment, the optical device coating assembly 100 can include a solenoid valve (not shown) to supply the pressurized air to the pneumatic actuator 120.

Although the coating system may include inputs and sensors, it is noteworthy that the optical device coating assembly 100 can be used to apply a uniform coating to the edges 51 of a optical device substrate 50 with very few inputs (e.g., stop/start controls) and in some embodiments zero sensors. This ability of the optical device coating assembly 100 to be fully functional without any sensors or other feedback offers a significant advantage relative to the complex designs included in the conventional techniques mentioned above that generally include multi-axis stages and/or robotic arms along with sensors for edge detection of the substrate and precision dispensers.

The memory 194 of the controller can include a program to adjust the speed of the first actuator 110 along a speed profile that is based on (1) the shape of the optical device substrate 50 (i.e., shape of the top surface 52) that is to be coated and (2) the positioning of the optical device substrate 50 on the substrate support 150. This program to adjust the speed of the first actuator 110 based on the shape of the optical device substrate 50 is designed, so that the speed of the first actuator 110 is adjusted as the optical device substrate 50 is rotated in order to cause each portion of a same length of the edges 51 of the optical device substrate 50 to pass the tip 61 of the coating applicator 60 with a constant linear speed or a substantially constant linear speed. Having each portion of the edges 51 of the optical device substrate 50 pass the tip 61 of the coating applicator 60 with the same linear speed is another factor that enables a coating having a uniform thickness to be applied to the edges 51 of the optical device substrate 50. In one embodiment, a distance from a center point of rotation on the optical device substrate 50 to the point on the edge 51 of the optical device substrate 50 is used to determine the rotational speed of the substrate support 150 when that point passes the coating applicator 60.

Figure 1B:
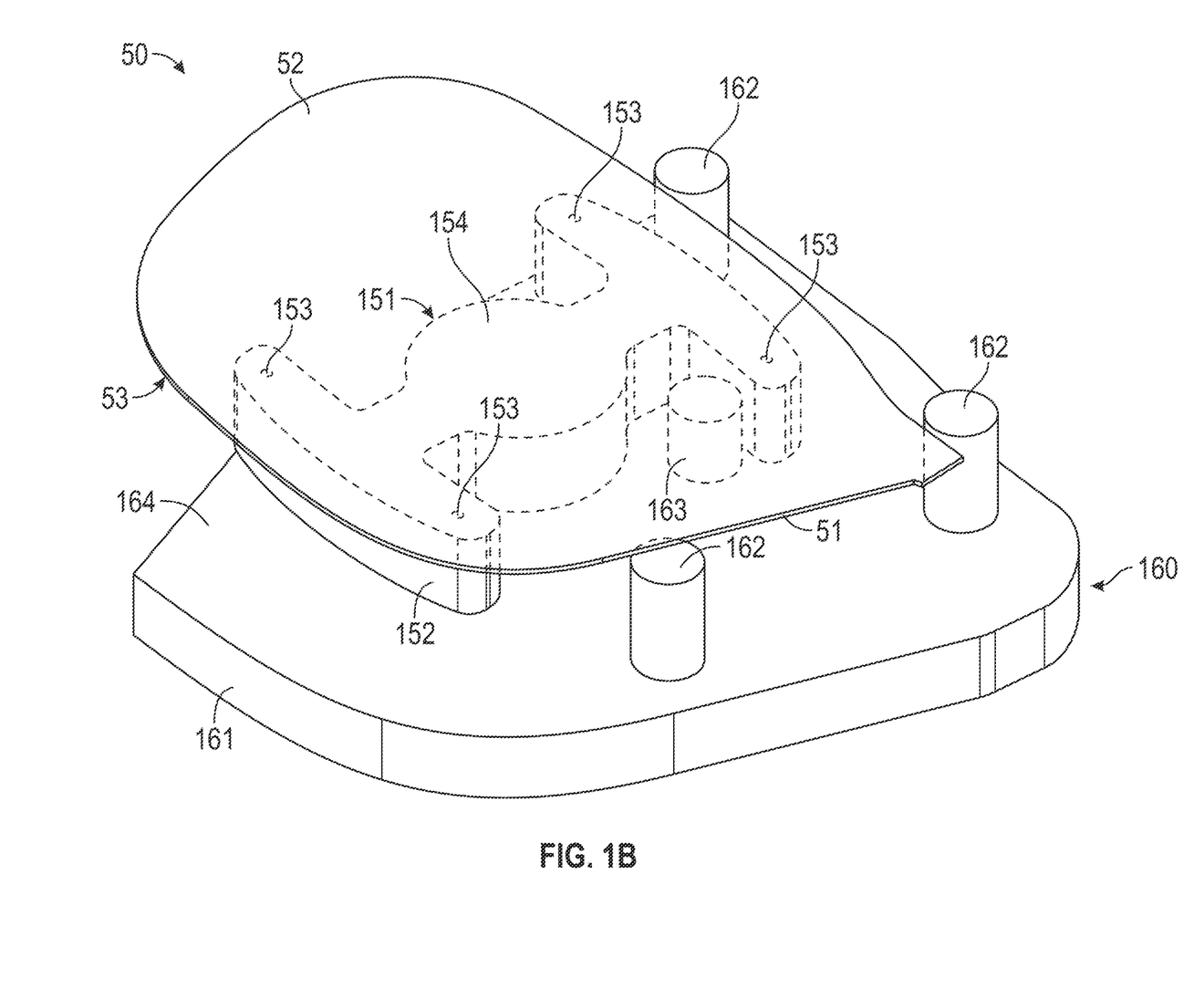
FIG. 1B is a perspective view of an alignment device, according to one embodiment.

FIG. 1B is a perspective view of an alignment device 160 and the optical device substrate 50 aligned on the vacuum chuck 151, according to one embodiment. The vacuum chuck 151 includes a body 152 having a top surface 154. The optical device substrate 50 is positioned on the top surface 154 of the body 152 of the vacuum chuck 151. The body 152 of the vacuum chuck 151 can include holes 153 in the top surface 154 for providing suction to keep the optical device substrate 50 properly positioned on the vacuum chuck 151.

The optical device substrate 50 is described as being a substrate to be used as a waveguide combiner in an augmented reality device. Substrates, such as the optical device substrate 50 can often have a non-circular shape, such as an irregular shape. The shape referred to here is the shape of the top surface of the substrate, such as the top surface 52 of the optical device substrate 50. Circular substrates are often used when the substrate being processed is rotated as it is generally easy to properly align circular substrates on the surface on which the substrate will be rotated. Rotating non-circular substrates (e.g., rectangular substrates) can be somewhat more challenging than rotating circular substrates and rotating irregularly shaped substrates (e.g., the optical device substrate 50) can be more challenging than rotating a rectangular substrate. An irregularly shaped substrate can be defined as a substrate that has no line of symmetry, which can bisect the top surface of the substrate into two identical portions. For example, the top surface 52 of the optical device substrate 50 cannot be bisected into two identical portions. A non-circular substrate can be defined as any substrate not having top surface with a circular shape and non-circular substrates include common shapes, such as substrates having a rectangular shape and also include irregularly shaped substrates.

Finding a proper center of rotation for an irregularly shaped substrate, such as the optical device substrate 50, can be challenging. Properly aligning an irregularly shaped substrate (e.g., optical device substrate 50) on the rotational support (e.g., vacuum chuck 151) helps the irregularly shaped substrate stay balanced when rotated. To assist in aligning the irregularly shaped optical device substrate 50 over the vacuum chuck 151, the alignment device 160 can be used.

The alignment device 160 can be placed under the body 152 of the vacuum chuck 151 as further described below in reference to FIGS. 1C and 1D. The alignment device 160 can include a base 161. The base 161 can include a top surface 164. The alignment device 160 can further include a plurality of alignment pins 162 extending upward from the top surface 164 of the base 161. The alignment device 160 can further include a registration pin 163 extending upward from the top surface 164 of the base 161. The alignment pins 162 can extend a further distance (e.g., have a higher height) from the base 161 than the registration pin 163 extends from the base 161. This height difference between the alignment pins 162 and the registration pin 162 allows the optical device substrate 50 to be placed on the vacuum chuck 151 without the registration pin 163 contacting the optical device substrate 50.

The registration pin 163 can be used to align the alignment device 160 with the vacuum chuck 151. In one embodiment, the registration pin 163 and the vacuum chuck 151 can include markings (e.g., matching lines or corresponding arrows) to assist with properly aligning the alignment device 160 with the vacuum chuck 151. The alignment pins 162 can be used to align the optical device substrate 50 on the vacuum chuck 151 after the vacuum chuck 151 is aligned with the registration pin 163. In some embodiments, the edges 51 of the optical device substrate 50 can contact the alignment pins 162, for example as shown in FIG. 1B. In some embodiments, the alignment pin 162 and the optical device substrate 50 can include markings (e.g., matching lines or corresponding arrows) to assist with properly aligning the optical device substrate 50 with the alignment pins 162, so that the optical device substrate 50 is properly positioned on the vacuum chuck 151.

Figure 1C:
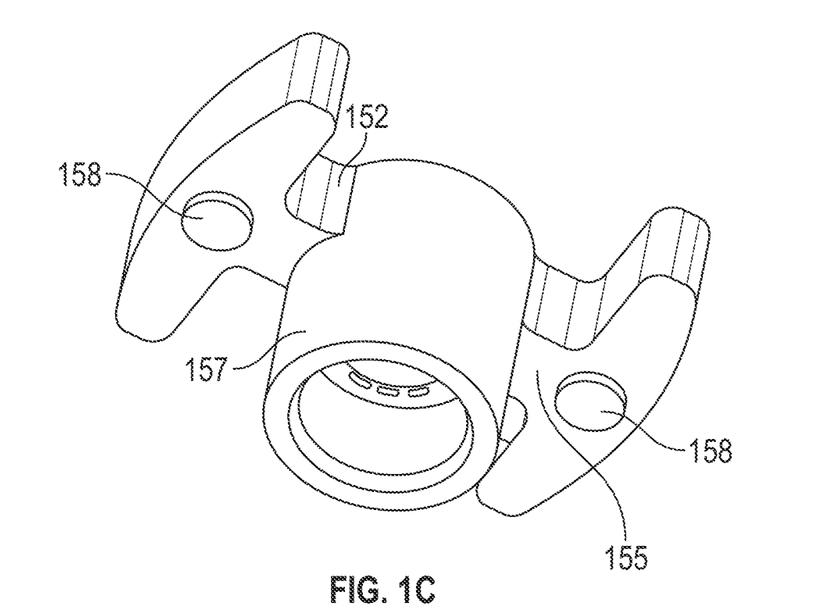
FIG. 1C is a bottom perspective view of the vacuum chuck, according to one embodiment.

FIG. 1C is a bottom perspective view of the vacuum chuck 151, according to one embodiment. The vacuum chuck 151 further includes a shaft 157 extending below the body 152 of the vacuum chuck 151. The body 152 of the vacuum chuck includes a bottom surface 155. Two magnets 158 are positioned on the bottom surface 155 of the body 152 of the vacuum chuck 151.

Figure 1D:
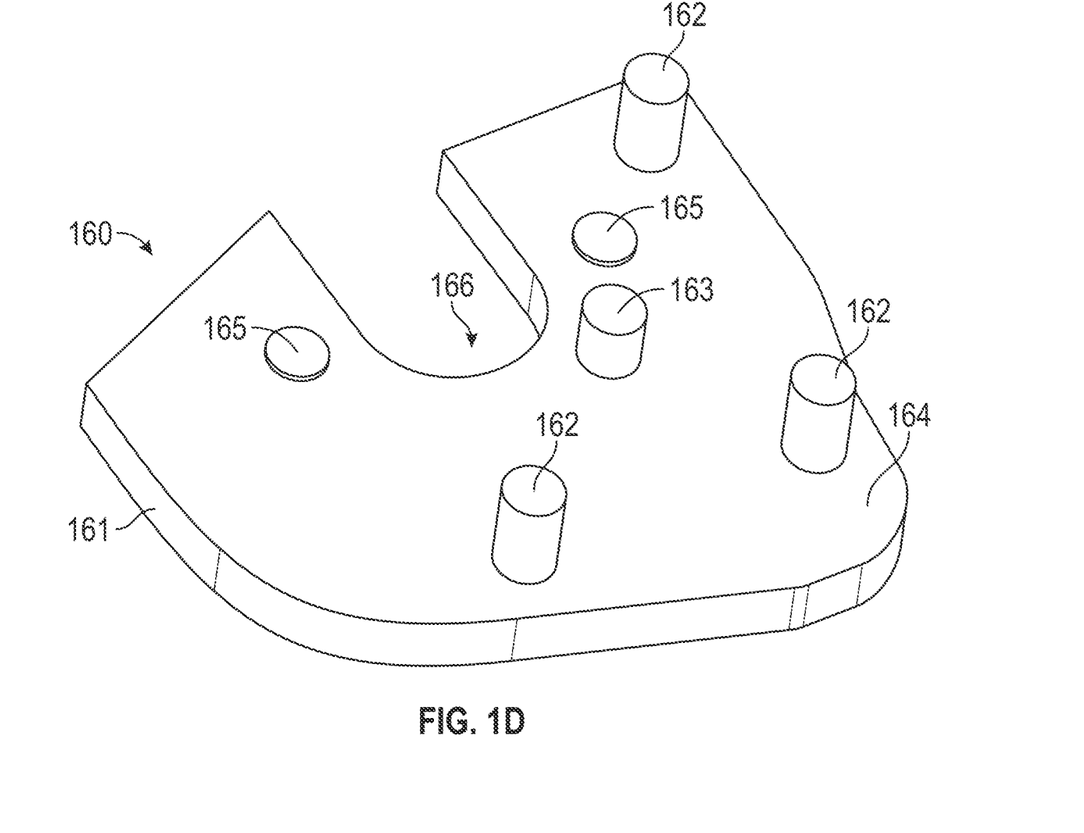
FIG. 1D is a top perspective view of the alignment device, according to one embodiment.

FIG. 1D is a top perspective view of the alignment device 160, according to one embodiment. Two magnets 165 are positioned on the top surface 164 of the base 161 of the alignment device 160. The magnets 165 can be positioned to align with the magnets 158 positioned on the bottom surface 155 of the body 152 of the vacuum chuck 151 to further assist in aligning the vacuum chuck 151 with the alignment device 160. The alignment device 160 can further include a notch 166. The notch 166 can allow the alignment device 160 to extend partially around the shaft 157 of the vacuum chuck 151 when the vacuum chuck 151 is aligned with the alignment device 160, for example as shown in FIG. 1B. The notch 166 also allows for removal of the alignment device 160 once the optical device substrate 50 is properly aligned on the vacuum chuck 151, so that the edges 51 of the optical device substrate 50 can be coated by the optical device coating assembly 100.

Figure 2:
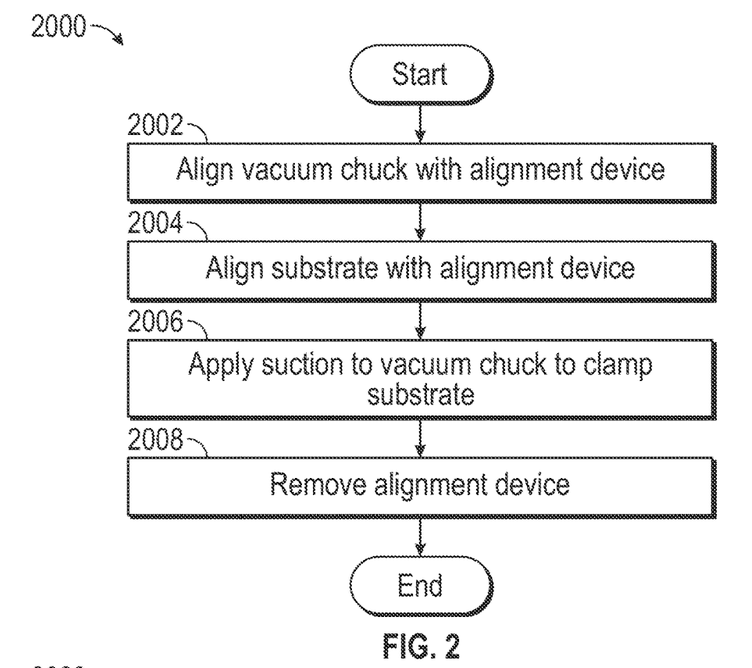
FIG. 2 is a process flow diagram of a method for aligning the substrate on the vacuum chuck by using the alignment device, according to one embodiment.

FIG. 2 is a process flow diagram of a method 2000 for aligning the optical device substrate 50 on the vacuum chuck 151 by using the alignment device 160, according to one embodiment. The method begins at block 2002.

At block 2002, the alignment device 160 is aligned with the vacuum chuck 151. In some embodiments, block 2002 can be performed prior to positioning the optical device substrate 50 on the vacuum chuck 151. Aligning the vacuum chuck 151 with the alignment device 160 can include positioning the notch 166 (FIG. 1D) of the alignment device 160 around the shaft 157 (FIG. 1C) of the vacuum chuck 151. This alignment can further include positioning the alignment device 160 to cause the magnets on the top surface 164 of the alignment device 160 to magnetically couple to the magnets 158 on the bottom surface 155 of the body 152 of the vacuum chuck 151. This alignment can further include positioning alignment device 160 to cause the vacuum chuck 151 to contact the registration pin 163, for example as shown in FIG. 1B. In one embodiment, the registration pin 163 and the vacuum chuck 151 can include markings (e.g., matching lines) to assist with properly aligning the alignment device 160 with the vacuum chuck 151. For example, in some embodiments these markings can be made to physically contact each other.

At block 2004, the optical device substrate 50 is aligned with the alignment pins 162 on the alignment device 160. For example, the edges 51 of the optical device substrate 50 can be positioned to contact the alignment pins 162, for example as shown in FIG. 1B. In some embodiments, the alignment pin 162 and the optical device substrate 50 can include markings (e.g., matching lines) to assist with properly aligning the optical device substrate 50 with the alignment pins 162, so that the optical device substrate 50 is properly positioned on the vacuum chuck 151. For example, in some embodiments these markings can be made to physically contact each other. Aligning the optical device substrate 50 with the alignment pins 162 allows a proper center of rotation to be established for the optical device substrate 50, so that the optical device substrate 50 can remain balanced when rotated by the substrate support 150. Furthermore, using the specified alignment resulting from use of the alignment pins 162 allows a clear starting point on the edges 51 of the optical device substrate 50 to be defined for coating the edges 51 of the optical device substrate 50. With this clear starting point defined, the speed at which the substrate support 150 is rotated can then be properly adjusted throughout the rotation of the optical device substrate 50, so that the linear speed of different portions of the edges 51 of the optical device substrate 50 remains constant as these different portions pass by and against the tip 61 of the coating applicator 60. This constant linear speed helps achieve a uniform coating on the edges 51 of the optical device substrate 50.

At block 2006, suction is applied to the vacuum chuck 151 to clamp the optical device substrate 50, so the optical device substrate 50 remains in the properly aligned position accomplished at block 2004. For example, the suction can be applied to the holes 153 shown in FIG. 1B to clamp the optical device substrate 50 in the proper position.

At block 2008, with the optical device substrate 50 clamped in the proper position, the alignment device 160 is removed. With the optical device substrate 50 in the proper position and the alignment device 160 removed, the edges 51 of the optical device substrate 50 can be coated by the optical device coating assembly 100. After the optical device substrate 50 is coated, the method 2000 can then be repeated using the same alignment device 160 when a substrate that is the same as the optical device substrate 50 is to be coated. If a substrate having a different size or shape than the optical device substrate 50 is to be coated, then a different alignment device may be used. For example, a larger alignment device may be needed for a larger substrate that has the same shape as the optical device substrate 50, so that the alignment pins can be placed further from the center of the vacuum chuck 151. Having an alignment device for the substrates of the different sizes and shapes can significantly reduce the amount of time spent properly loading the different substrates on the substrate support 150.

Figure 3:
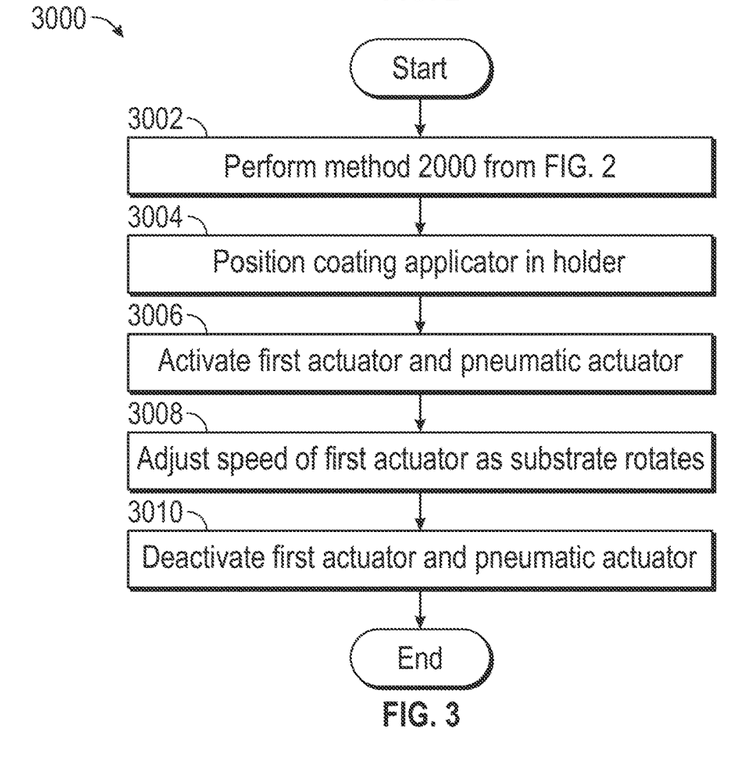
FIG. 3 is a process flow diagram of a method for coating the edges of the substrate with the coating system, according to one embodiment.

FIG. 3 is a process flow diagram of a method 3000 for coating the edges 51 of the optical device substrate 50 with the optical device coating assembly 100, according to one embodiment. The method begins at block 3002.

At block 3002, the method 2000 is performed as described in reference to FIG. 2, so that the optical device substrate 50 is properly positioned on the vacuum chuck 151.

At block 3004, the coating applicator 60 is positioned in the holder 130. This positioning can include positioning the coating applicator 60 positioned into the clamp 131 of the holder 130. This positioning can further include adjusting the tilt arm 132 to ensure the tip 61 of the coating applicator 60 is at the proper height to contact the edges 51 of the optical device substrate 50 when the optical device substrate 50 is rotated on the vacuum chuck 151. The coating applicator 60 includes the coating to be applied to the edges 51 of the optical device substrate 50. In some embodiments, the coating can be an optically absorbent coating that can be used to darken (e.g., blacken) the edges 51 of the optical device substrate 50.

At block 3006, the first actuator 110 and the pneumatic actuator 120 are activated. Activating the first actuator 110 causes the substrate support 150 to begin to rotate, so that the optical device substrate 50 on the vacuum chuck 151 of the substrate support 150 begins to rotate. Activating the pneumatic actuator 120 causes the pneumatic actuator 120 to apply a force on the holder 130. For example, the force from the pneumatic actuator 120 can move the holder 130 towards substrate support 150 (e.g., the X-direction in FIG. 1A). Because the coating applicator 60 was positioned at block 3004 to cause the tip 61 of the coating applicator 60 to be at the proper height to contact the edges 51 of the optical device substrate 50, the force from the pneumatic actuator 120 also causes the tip 61 of the coating applicator 60 to contact a portion of an edge 51 of the optical device substrate 50.

In some embodiments, the controller 190 can be used to activate the first actuator 110 and the pneumatic actuator 120. In some embodiments, the actuators 110, 120 can be activated simultaneously. In other embodiments, the pneumatic actuator 120 can be activated and then after a short delay (e.g., 50 ms, 100 ms, 500 ms etc.), the first actuator 110 can be activated. The short delay can be timed to allow the tip 61 of the coating applicator 60 to briefly contact the starting point on the edge 51 of the optical device substrate 50 before the optical device substrate 50 begins to rotate, so that the starting point on the edge is coated similarly to the rest of the locations on the edges 51 of the substrate.

At block 3008, the speed of the first actuator 110 is adjusted to vary the speed at which the vacuum chuck 151 on the substrate support 150 rotates in order to cause different portions of one or more edges 51 or all portions all of the edges 51 (i.e., 360 degrees around the edges 51) of the optical device substrate 50 to pass by and against the tip 61 of the coating applicator 60 at a constant linear speed or a substantially constant linear speed. The controller 190 can be used to vary the speed of the first actuator 110 during block 3008. The controller 190 can be configured to control this rotational speed to cause the constant or substantially constant linear speed of the edges 51 of the optical device substrate 50 by and against the coating applicator 60 for a non-circular substrate (e.g., a rectangular substrate) or for an irregularly shaped substrate (e.g., the optical device substrate 50). As mentioned above, although the controller 190 is shown as a single controller in FIG. 1A, this is meant for ease of illustration, and control of the different components of the optical device coating assembly 100 can be distributed across multiple components. For example, in one embodiment, the first actuator 110 is a "smart" motor that can include its own controller to vary the speed at which the motor rotates in order to cause the constant or substantially constant linear speed of the edges 51 of the optical device substrate 50 past and against the coating applicator 60. In another embodiment, the first actuator 110 is a servo that receives signals, for example from the controller 190, that are used to control the speed of the first actuator 110.

During blocks 3006 and 3008, the vacuum chuck 151 is configured to hold the optical device substrate 50 positioned on the vacuum chuck 151 in place as the pneumatic actuator 120 applies a constant force on the edges 51 of the optical device substrate 50 during rotation of the vacuum chuck 151 for 360 degrees.

At block 3010, the first actuator 110 and the pneumatic actuator 120 are deactivated. Deactivating the first actuator 110 causes the substrate support 150 to stop rotating. Deactivating the pneumatic actuator 120 can cause the holder 130 and the coating applicator 60 to move away from the substrate support 150. In some embodiments, the pneumatic actuator 120 can be deactivated and then after a short delay the first actuator 110 can be deactivated. The pneumatic actuator 120 can be deactivated when a specified amount of rotation has occurred with the coating applicator 60 being pressed against the edges 51 of the optical device substrate 50. In some embodiments, this specified amount of rotation can be when one or more full rotations of 360 degrees from the starting point (i.e., the first point on the edge 51 that is coated) are completed. The controller 190 can be used to deactivate the first actuator 110 and the pneumatic actuator 120.

The optical device coating assembly 100 described above can also be used to provided different sections of uniform thickness around the edges of a substrate, such as the optical device substrate 50. For example, if specifications call for a rectangular substrate to have a uniform coating of a first thickness on the two longer sides of the rectangular substrate and a uniform coating of a second thickness on the shorter two sides of the rectangular substrate, then optical device coating assembly 100 can adjust the rotational speed of the substrate support 150 by adjusting the speed of the first actuator 110 and/or adjust the amount of force applied by the pneumatic actuator 120 to generate the different thicknesses of uniform coatings. For example, to apply a thicker coating the rotational speed of the substrate support 150 can be slowed down by slowing down the first actuator 110, or the amount of force applied by the pneumatic actuator 120 can be increased. Conversely, to apply a thinner coating the rotational speed of the substrate support 150 can be increased by speeding up the first actuator 110, or the amount of force applied by the second actuator 120 can be decreased. The speed of the first actuator 110 and/or the force applied by the pneumatic actuator 120 can also be gradually changed to apply gradual changes in the thickness of the coating applied to the edges.

Figure 4:
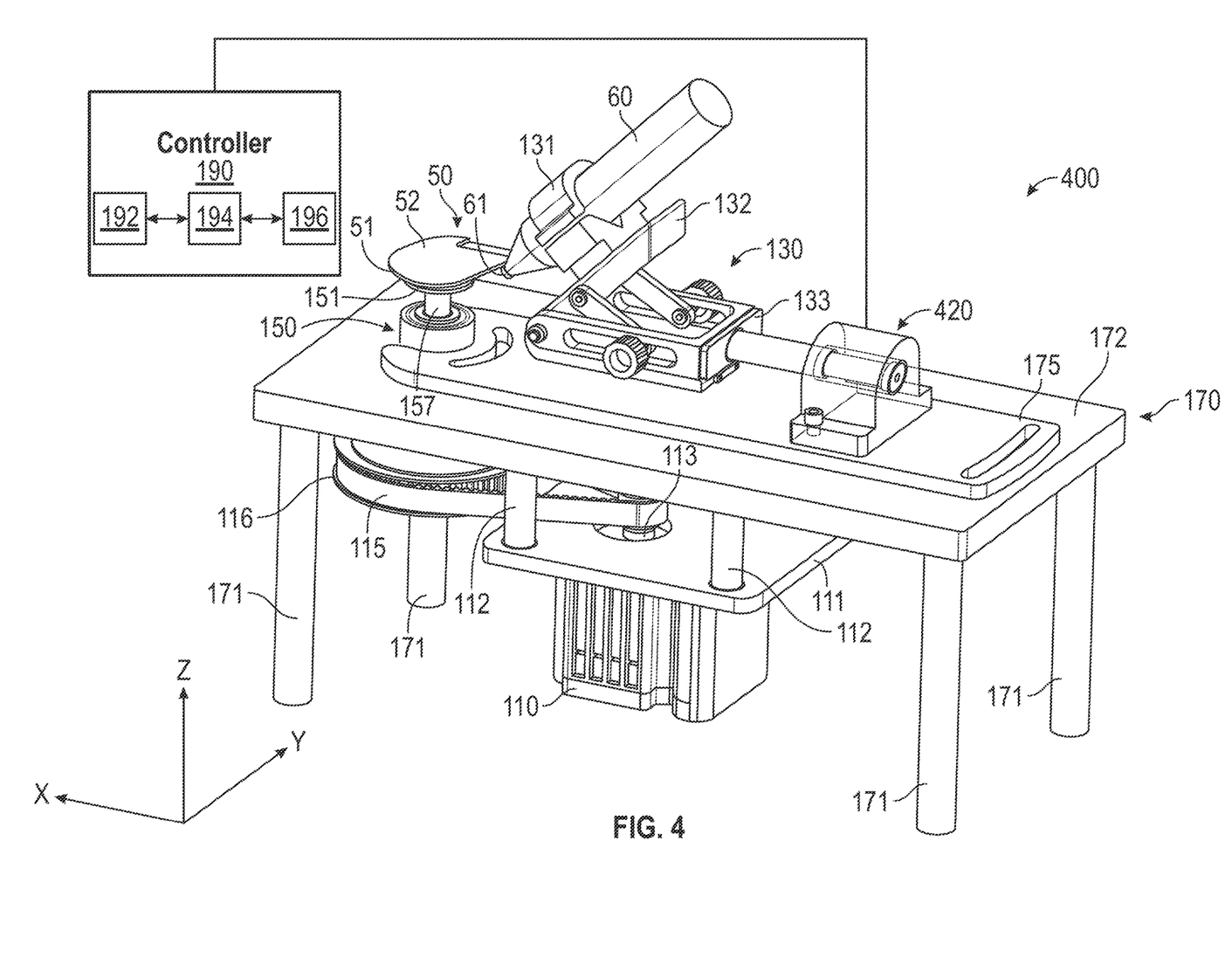
FIG. 4 is a perspective view of a coating assembly, according to one embodiment.

FIG. 4 is a perspective view of an optical device coating assembly 400, according to one embodiment. The optical device coating assembly 400 is the same as the optical device coating assembly 100 described above in reference to FIGS. 1A-1D except that the pneumatic actuator 120 is replaced with a voice coil 420. The voice coil 420 is a constant force actuator like the pneumatic actuator 120 described above. Thus, the voice coil 420 can provide any and all of the same functionality described above in reference to the pneumatic actuator 120. While the pneumatic actuator 120 uses compressed air to apply a constant force on the holder 130 that holds the coating applicator against the optical device substrate 50, the voice coil 420 uses electrical power to apply a constant force on the holder 130 that holds the coating applicator against the optical device substrate 50.

The coating assemblies and related methods described above can be used for coating the edge(s) of optical device substrates (e.g., edges of a substrate to be used as a waveguide combiner or a flat optical device) with a uniform thickness of optically absorbent material. In one embodiment, the thickness of the coating is from about 10 μm to about 100 μm, with a surface encroachment width ranging from about 0 to about 1000 μm. This uniform thickness on the edge(s) of the optical devices is achieved by using the constant force actuator (e.g., pneumatic actuator or voice coil) to apply the coating on the edge of the substrate as the substrate is rotated past and against a coating applicator. In addition to the constant force applied by the actuator, the rotational speed of the substrate is adjusted throughout the rotation to cause edges of the substrate to move past and against the coating applicator at a constant linear speed, so that different segments of the edges spend the same time passing by the applicator. This constant force and constant linear speed results in a uniform coating on the edges of the substrate even when the substrate has an irregular shape, which is common for optical devices, such as waveguide combiners. Furthermore, the equipment and methods described herein are substantially less complex than conventional techniques used to apply a uniform coating on an edge of substrate, such as techniques involving multi-axis stages and/or robotic arms along with sensors for edge detection of the substrate and precision dispensers. While being substantially less complex than these conventional techniques, the equipment and methods described herein offers significantly improved uniformity results when compared to manually applying the coating to an edge of an optical device substrate.

While the foregoing is directed to examples of the present disclosure, other and further examples of the disclosure may be devised without departing from the basic scope thereof, and the scope thereof is determined by the claims that follow.

What is claimed is:

1. An optical device coating assembly, comprising:
a substrate support disposed on a platform, the substrate support operable to retain an optical device substrate;
a first actuator connected to the substrate support, wherein the first actuator is configured to rotate the substrate support;
a holder disposed on the platform, the holder configured to hold a coating applicator against an edge of the optical device substrate when the optical device substrate is rotated on the substrate support; and
a second actuator operable to apply a force on the holder in a direction towards the substrate support, wherein the second actuator is a constant force actuator.

2. The assembly of claim 1, wherein the constant force actuator is a pneumatic actuator.

3. The assembly of claim 1, wherein the constant force actuator is a voice coil.

4. The assembly of claim 1, further comprising a controller in communication with the first actuator, the controller configured to cause the first actuator to adjust a rotational speed of the substrate support in order to cause different portions of an edge of a non-circular optical device substrate positioned on the substrate support to rotate against a coating applicator in the holder at a constant linear speed.

5. The assembly of claim 4, wherein the controller is configured adjust the rotational speed of the substrate support to cause all portions of the edges of the non-circular optical device substrate positioned on the substrate support to rotate against the coating applicator in the holder at the constant linear speed as the substrate support is rotated 360 degrees.

6. The assembly of claim 1, further comprising a controller in communication with the first actuator, the controller configured to cause the first actuator to adjust a rotational speed of the substrate support in order to cause different portions of an edge of an irregularly shaped optical device substrate positioned on the substrate support rotate against a coating applicator in the holder at a constant linear speed.

7. The assembly of claim 6, wherein the controller is configured adjust the rotational speed of the substrate support to cause all portions of the edges of the irregularly shaped optical device substrate positioned on the substrate support to rotate against the coating applicator in the holder at the constant linear speed as the substrate support is rotated 360 degrees.

8. The assembly of claim 1, wherein the second actuator is configured to move a tip of the coating applicator in the holder from a first position to a second position.

9. The assembly of claim 8, wherein the second actuator is configured to cause the coating applicator positioned in the holder to apply a coating on an edge of the optical device substrate in the first position and the second position.

10. The assembly of claim 1, wherein the substrate support includes a vacuum chuck.

11. The assembly of claim 10, wherein the vacuum chuck is configured to hold an optical device substrate positioned on the vacuum chuck in place as the second actuator applies a constant force on the edges of the optical device substrate during rotation of the vacuum chuck for 360 degrees.

12. The assembly of claim 10, wherein the coating applicator is a marker, pen, marker pen, a sponge applicator, a foam applicator, or a rubber wheel.

13. The assembly of claim 6, wherein the controller is in communication with the second actuator.

14. The assembly of claim 13, wherein the controller activates the second actuator and after a delay activates the first actuator.

15. The assembly of claim 1, further comprising an alignment device operable to align the optical device substrate, the alignment device positioned between the substrate support and the optical device substrate, the alignment device including alignment pins.

16. The assembly of claim 1, wherein the first actuator is connected to the platform.

17. The assembly of claim 1, wherein the second actuator is disposed on the platform.

* * * * *